(12) United States Patent
Marks et al.

(10) Patent No.: US 7,388,591 B2
(45) Date of Patent: Jun. 17, 2008

(54) SIZE-BASED FONT SMOOTHING

(75) Inventors: Alan L. Marks, Seattle, WA (US); Jason T. Barnett, Renton, WA (US)

(73) Assignee: Microsoft Corporation, Redmond, WA (US)

(*) Notice: Subject to any disclaimer, the term of this patent is extended or adjusted under 35 U.S.C. 154(b) by 7 days.

(21) Appl. No.: 11/227,043

(22) Filed: Sep. 15, 2005

(65) Prior Publication Data
US 2007/0057950 A1    Mar. 15, 2007

(51) Int. Cl.
*G09G 5/00* (2006.01)

(52) U.S. Cl. ...................... 345/611; 345/467

(58) Field of Classification Search ............. None
See application file for complete search history.

(56) References Cited

U.S. PATENT DOCUMENTS

| | | | | |
|---|---|---|---|---|
| 4,331,955 A | * | 5/1982 | Hansen | 345/611 |
| 4,851,825 A | * | 7/1989 | Naiman | 345/596 |
| 5,684,510 A | * | 11/1997 | Brassell et al. | 345/443 |
| 5,778,403 A | * | 7/1998 | Bangs | 715/527 |
| 6,154,576 A | * | 11/2000 | Anderson et al. | 382/269 |
| 6,577,351 B1 | * | 6/2003 | Yu et al. | 348/624 |
| 6,985,160 B2 | * | 1/2006 | Brown et al. | 345/613 |
| 7,002,597 B2 | * | 2/2006 | Arnold et al. | 345/611 |
| 7,134,091 B2 | * | 11/2006 | Dresevic et al. | 715/771 |
| 2003/0080969 A1 | * | 5/2003 | Barmettler | 345/611 |
| 2003/0214513 A1 | * | 11/2003 | Brown et al. | 345/611 |
| 2004/0227771 A1 | * | 11/2004 | Arnold et al. | 345/611 |

* cited by examiner

*Primary Examiner*—Mark Zimmerman
*Assistant Examiner*—David Chu
(74) *Attorney, Agent, or Firm*—Merchant & Gould P.C.

(57) ABSTRACT

Font smoothing technology is employed to enhance the readability of rendered text. Various font smoothing approaches can be used by an application to optimize the readability of text to be rendered.

19 Claims, 3 Drawing Sheets

SIZE-BASED FONT SMOOTHING

BACKGROUND

Relatively low definition displays (such as commonly-used liquid crystal displays used in laptop computers, PDA and cell phone devices, and other kinds of flat panel monitors) often display text that appears to have rough and jagged edges. This may also occur when rendering text image from a low resolution source (such as a web page) using a high-resolution rendering device (such as the printer). This phenomenon is referred to as "aliasing" and occurs when an original image containing high spatial frequencies is "aliased down" by rendering on a low-frequency device.

Various font smoothing approaches have been developed to reduce the effects of aliasing. Font smoothing works by adding intermediate scaled pixels to the corners, curves and diagonals of characters in order to make them appear to be smoother and less jagged than would otherwise appear. Grayscale anti-aliasing is one approach that works by assigning pixels of intermediate values to around the edges of aliased characters, which blurs the edges of the aliased characters. The blurred edges of the aliased characters render the jagged edges to be less noticeable to the human visual system, although the clarity of the characters is often decreased.

ClearType® is another font smoothing approach that improves the readability of text runs. ClearType® works by using individual vertical color stripe elements for every pixel of an LCD screen. Thus ClearType® (using an LCD) can display features of text using horizontal fractions of a pixel. Using fractions of a pixel width increases the apparent resolution of the display such that the text is easier to read and human fatigue is lessened. (This background information is not intended to identify problems that must be addressed by the claimed subject matter.)

SUMMARY

This summary is provided to introduce a selection of concepts in a simplified form that are further described below in the Detail Description Section. This summary is not intended to identify key features or essential features of the claimed subject matter, nor is it intended to be used as an aid in determining the scope of the claimed subject matter.

According to aspects of various described embodiments, implementations are provided for creating a mechanism for selecting a particular font smoothing technique in response to the physical size of the typeface to be rendered. In one aspect, a physical description parameter is received that describes a physical characteristic of a rendering surface in which text is to be rendered. A first threshold for selecting between font smoothing approaches is also received. The received physical description is compared with the received first threshold such that one of the font smoothing approaches is chosen in response to the comparison of the received physical description with the received first threshold.

According to another aspect, a computer-implemented system includes a document that is configured to receive and store text to be rendered, a rendering surface that is configured to render text, and an application that is configured to receive a physical description of a portion of a text run that is at rendered in accordance with the rendering surface and to receive a first threshold. A font smoothing approach selection mechanism chooses a font smoothing approach in response to the received physical description with the received first threshold.

According to another aspect, a computer-implemented system includes a document means for receiving and storing text to be rendered on a rendering surface and an application means for receiving a physical description of a portion of a text run that is at rendered in accordance with the rendering surface and for receiving a first threshold. A comparing means compares the received physical description with the received first threshold such that a selection means selects a font smoothing approach in response to the comparing of the received physical description with the received first threshold.

Embodiments may be implemented as a computer process, a computer system (including mobile handheld computing devices) or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Font smoothing technology is employed to enhance the readability of rendered text. Various font smoothing approaches can be used by an application to optimize the readability of text to be rendered. Various approaches to font smoothing have certain advantages and/or limitations that vary in accordance with the physical size of the font being rendered.

For example, using ClearType® font smoothing typically works well for small fonts, while using grayscale anti-aliasing works well for larger fonts. Size-based font smoothing determines the physical size of the font to be rendered, and in response selects an optimal font smoothing approach. One possible optimal font smoothing approach is a font smoothing approach results in text that appears more pleasing and/or less fatiguing to the human vision system and text rendered by either using no font smoothing or by using other font smoothing approaches.

Exemplary System for Size-Based Font Smoothing

Figure 1:
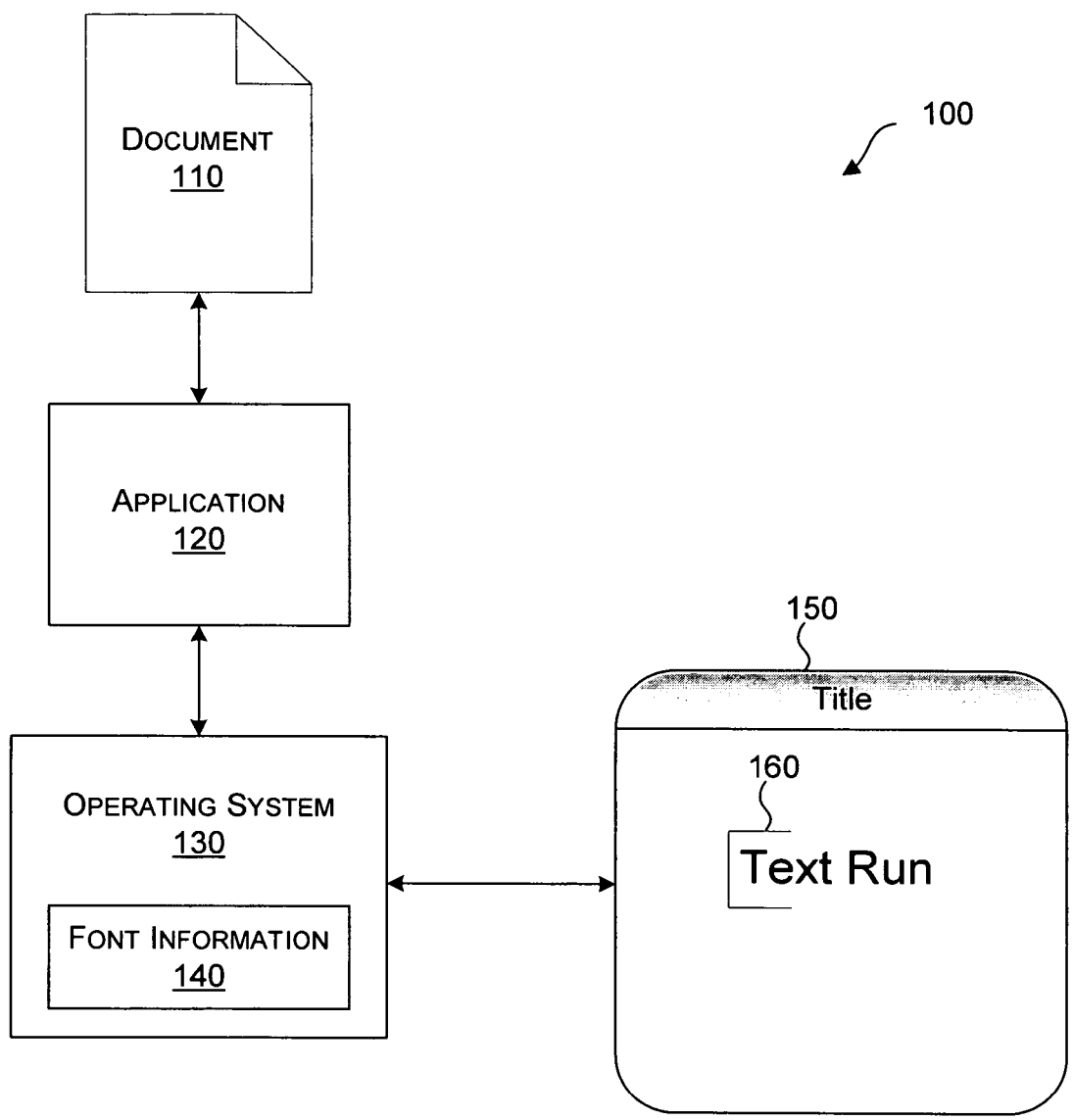
FIG. 1 illustrates an exemplary font smoothing system 100 for size-based font smoothing, according to one embodiment.

FIG. 1 illustrates an exemplary font smoothing system 100 for size-based font smoothing, according to one embodiment. In one embodiment, system 100 is implemented on a computer system, such as a mobile device, PDA, cell phone, and the like. System 100 comprises a document (110), an application (120), an operating system (130), and a rendering surface (150). Operating system 130 typically comprises font information 140, which comprises information that is used to render a font. In various embodiments, these (and other components) may be integrated logically and/or physically in various hardware and/or software configurations of components.

Document 110 is any document that comprises text (such as characters, numbers, symbols, ideographs, diacritical markings, and the like) for rendering (including displaying, printing, and the like). Document 110 is typically a data structure comprising text that is accessed and modified by application 120 in accordance with a user's commands.

Application 120 is configured to format text from document 110 for rendering. To render text, application 120 accesses text from document 110 to be rendered and determines parameters related to the physical area in which the font is to be rendered. In one embodiment, application 120 queries operating system 130 to determine font information and the height of text run 160 in pixels.

Operating system 130 is configured to manage device calls within system 100, and in particular to handle calls related to rendering surface 150. Rendering surface 150 is a surface, such as provided by a printer or a screen, upon which an image can be rendered. Operating system 130 provides application 120 with font information that is used by the text of document 110. Operating system 130 also determines physical parameters used for rendering the text of document 110 and returns the determined physical parameters (such as the height of the text run) to application 120.

Application 120 receives the determined physical parameters related to the physical size of the font to be rendered and selects a particular font smoothing approach in response. In an embodiment, a selected font smoothing threshold is maintained as a "regkey" value. When a font is to be rendered, the height of the text run is compared to a selected font smoothing threshold and the determination is made whether to render using ClearType® or grayscale anti-aliasing. For example, if the height of the text run is less than the smoothing threshold, the ClearType® font smoothing approach is chosen.

In various embodiments, the font smoothing approach mechanism can be included by application 120, operating system 130, or distributed across these and other system components. For example, operating system 130 can comprise the font smoothing approach mechanism in addition to or in conjunction with font information 140.

Additionally, the degree to which font smoothing is useful for a given font size varies in accordance with which font is selected. In various embodiments, a separate threshold is specified for each available font. One method for specifying the thresholds is to visually inspect text of a selected font that is rendered using different pixel heights and to select a threshold at which the differences between different font smoothing approaches appears to be minimized. Additional thresholds can be used for rendering (in a single font) when three or more different smoothing approaches are used. Selection of the various thresholds can also be made by visual inspection.

For the smallest levels of heights of pixels for the text run, text can often be more clearly read without font smoothing. In some embodiments, an additional threshold is used to select a threshold below which no font smoothing will be performed.

Exemplary Flow for Size-Based Font Smoothing

Figure 2:
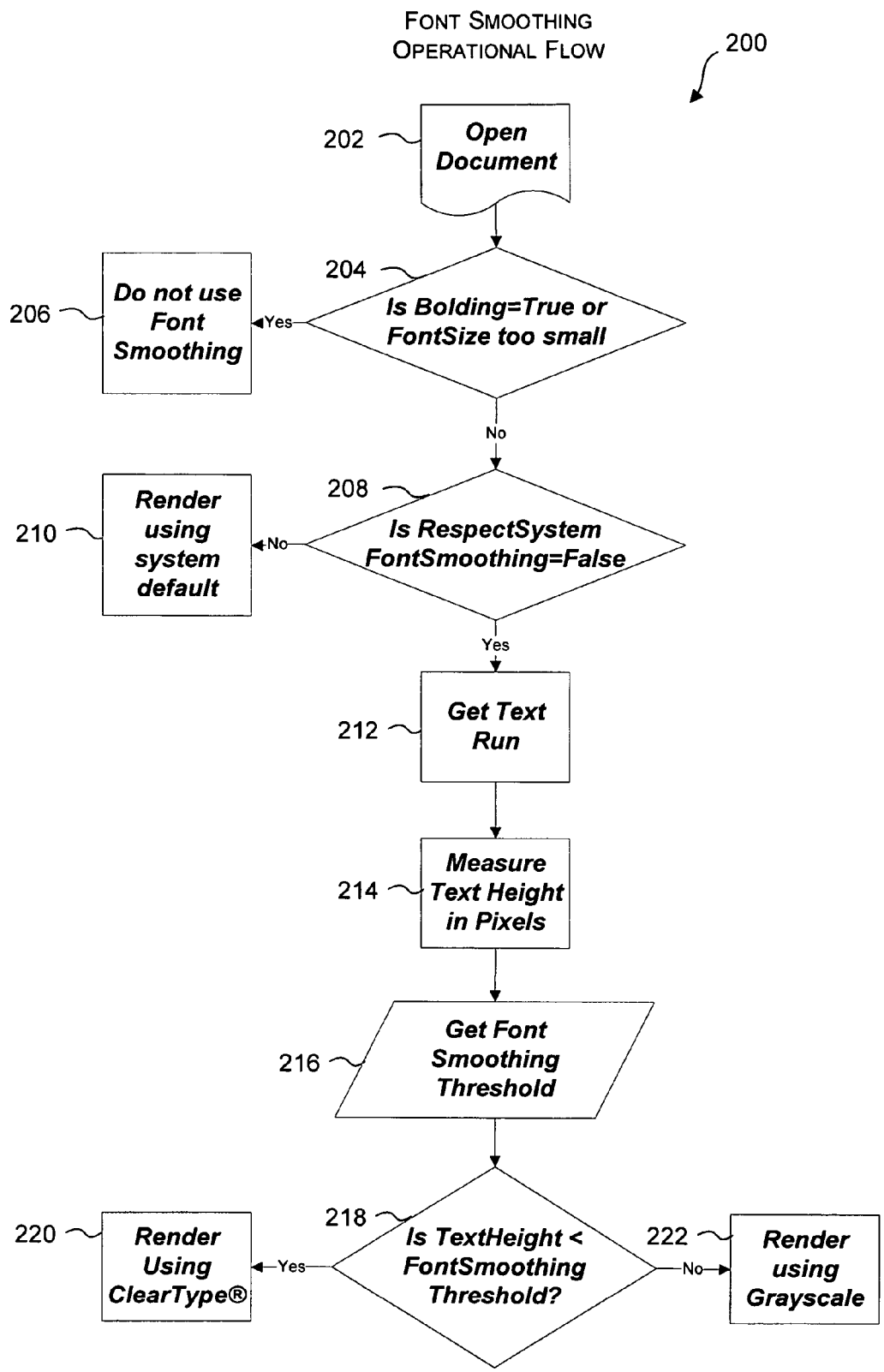
FIG. 2 illustrates an operational flow 200 for size-based font smoothing, according to one embodiment.
Figure 3:
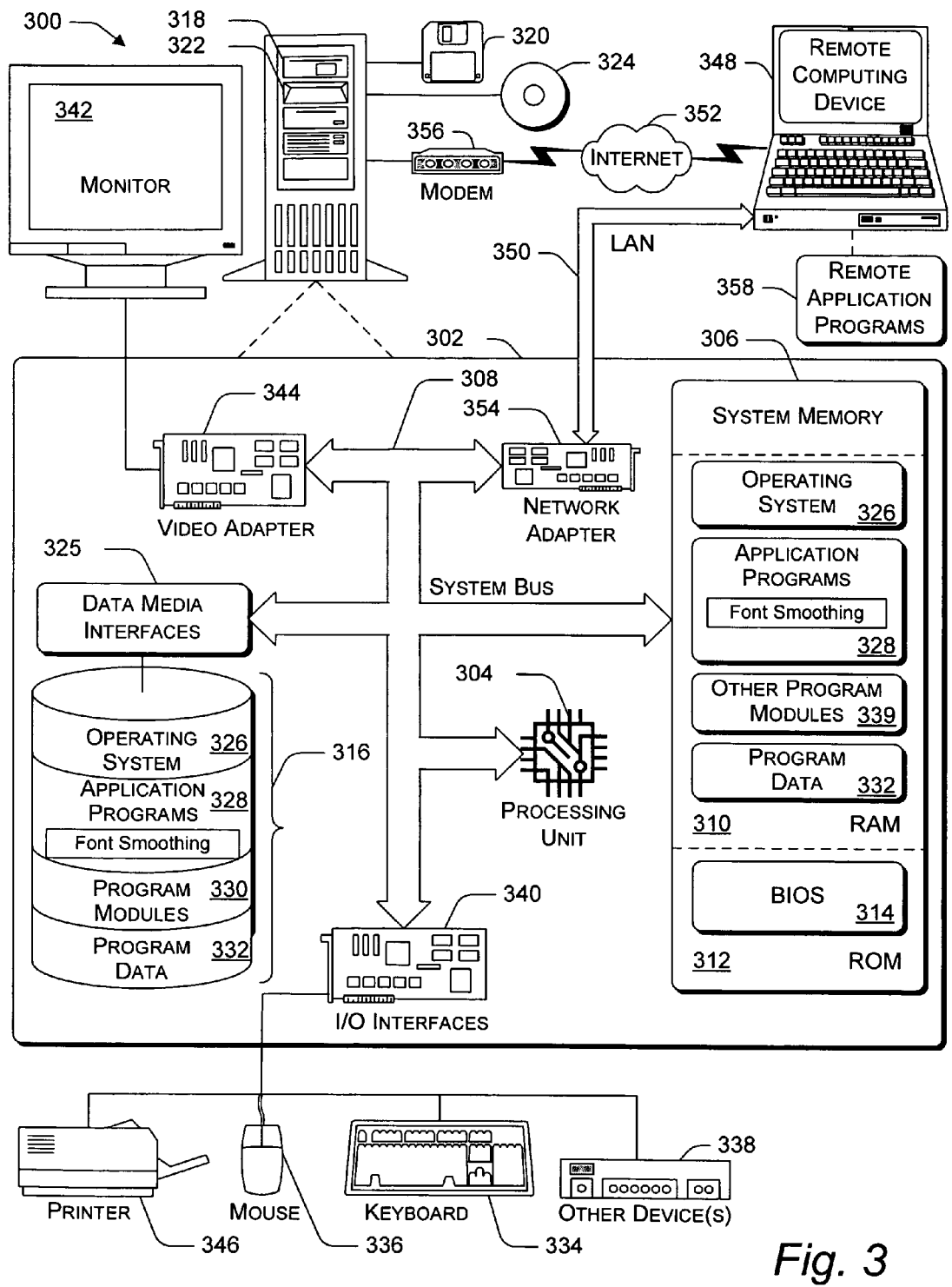
FIG. 3 illustrates a general computer environment 300, which can be used to implement the techniques described herein.

FIG. 2 illustrates an operational flow 200 for size-based font smoothing, according to one embodiment. Operational flow 200 may be performed in any suitable computing environment. For example, operational flow 200 may be executed by an application such as user application 120 (FIG. 1) or application programs 328 (FIG. 3, below) to perform the searching and comparison. Therefore, the description of operational flow 200 may refer to at least one of the components of FIGS. 1 and 3. However, any such reference to components of FIGS. 1 and 3 is for descriptive purposes only, and it is to be understood that the implementations of FIGS. 1 and 3 are a non-limiting environment for operational flow 200.

At block 202, an application opens a document containing text (such as characters, numbers, symbols, ideographs, diacritical markings, and the like). In one embodiment, the text has attributes that specify the font in which the text is to be rendered.

At block 204, various text attributes are optionally consulted to determine whether font smoothing mechanisms are to be employed. In an embodiment, the Bolding attribute and the Font Size attribute are consulted. If the text is to be bolded or if the font size is less than a size at which font smoothing is desirable, the flow proceeds to block 206. If no text attributes are implicated that would suggest that font smoothing should not be performed, the flow proceeds to block 212 for further processing relating to font smoothing.

In other embodiments, selected text attributes can be separately evaluated and separate actions (or no actions at all) taken in response. For example, evaluating a Bold attribute for degrees of "boldness" allows for selecting between various font smoothing approaches (as discussed below with reference to block 218, for example). Optionally, where no actions are to be taken, substantially no font smoothing actions can be taken where either no font smoothing is performed or font smoothing that is not detectable by the human vision system is performed.

At block 206, the decision not to use font smoothing is implemented and the text is rendered on the rendering surface without using font smoothing.

At block 208, a Boolean value is optionally consulted to determine whether a system default font smoothing mechanism is to be used (as compared to, for example, application-based font smoothing mechanisms). In an embodiment, the value Respect System Font Smoothing is user-selectable. If the value Respect System Font Smoothing is set to be true, the flow proceeds to block 210. If the value Respect System Font Smoothing is set to be false, the flow proceeds to block 212 where a font smoothing provided by the application is used. This allows the application to provide font smoothing algorithms (including algorithms disclosed herein) to be provided for a variety of systems, including legacy systems.

At block 210, a font smoothing provided by the system is used (if value Respect System Font Smoothing is set true). This allows a system to provide font smoothing algorithms (including algorithms disclosed herein) to be tailored to system characteristics, including characteristics of displays.

At block 212, a text run block is obtained. The text run block is obtained, for example, by rendering a text run (or part of a text run) as it would appear on the display surface. When the text run block is obtained, physical parameters about the text block can then be considered that describe the surface in which the smoothed font text is to be rendered.

At block 214, the height of the text run is determined. The height of the text run conveys the level of spatial frequencies of text as the text will actually appear in the rendering surface. The height of the text run can be conveyed by the number of pixels in a vertical direction that are used to render the text run.

At block 216, the font smoothing threshold is obtained. A font smoothing threshold is a threshold that is used to select a particular font smoothing approach. The font smoothing threshold is typically stored with the font information, although other locations are possible. The font smoothing threshold is also typically specified as numbers of pixels to allow easy comparison with the height of the text run, for example.

At block 218, the text run height is compared with the font smoothing threshold. If the text height is less than the font smoothing threshold, the flow proceeds to block 220 where the text is rendered using a first font smoothing approach. If the text height parameter is not less than the font smoothing threshold, the flow proceeds to block 222 where the text is rendered using a second font smoothing approach.

At block 220, the text is rendered using a first font smoothing approach. In an embodiment, the ClearType® font smoothing approach is used. Accordingly, text that is not bolded and that is not too small to be font smoothed and that is also lower than a predetermined font smoothing threshold is rendered using ClearType® font smoothing technology.

At block 222, the text is rendered using a second font smoothing approach. In an embodiment, the grayscale font smoothing approach is used. Accordingly, text that is not bold and that is not too small to be font smoothed and that is also not lower than a predetermined font smoothing threshold is rendered using grayscale font smoothing technology.

Illustrative Operating Environment

FIG. 3 illustrates a general computer environment 300, which can be used to implement the techniques described herein. The computer environment 300 is only one example of a computing environment and is not intended to suggest any limitation as to the scope of use or functionality of the computer and network architectures. Neither should the computer environment 300 be interpreted as having any dependency or requirement relating to any one or combination of components illustrated in the example computer environment 300.

Computer environment 300 includes a general-purpose computing device in the form of a computer 302. The components of computer 302 can include, but are not limited to, one or more processors or processing units 304, system memory 306, and system bus 308 that couples various system components including processor 304 to system memory 306.

System bus 308 represents one or more of any of several types of bus structures, including a memory bus or memory controller, a peripheral bus, an accelerated graphics port, and a processor or local bus using any of a variety of bus architectures. By way of example, such architectures can include a Peripheral Component Interconnects (PCI) bus also known as a Mezzanine bus, a PCI Express bus (and the like), a Universal Serial Bus (USB), a Secure Digital (SD) bus, and/or an IEEE 1394, i.e., FireWire bus.

Computer 302 may include a variety of computer readable media. Such media can be any available media that is accessible by computer 302 and includes both volatile and non-volatile media, removable and non-removable media.

System memory 306 includes computer readable media in the form of volatile memory, such as random access memory (RAM) 310; and/or non-volatile memory, such as read only memory (ROM) 312 or flash RAM. Basic input/output system (BIOS) 314, containing the basic routines that help to transfer information between elements within computer 302, such as during start-up, is stored in ROM 312 or flash RAM. RAM 310 typically contains data and/or program modules that are immediately accessible to and/or presently operated on by processing unit 304.

Computer 302 may also include other removable/non-removable, volatile/non-volatile computer storage media. By way of example, FIG. 3 illustrates hard disk drive 316 for reading from and writing to a non-removable, non-volatile magnetic media (not shown), magnetic disk drive 318 for reading from and writing to removable, non-volatile magnetic disk 320 (e.g., a "floppy disk"), and optical disk drive 322 for reading from and/or writing to a removable, non-volatile optical disk 324 such as a CD-ROM, DVD-ROM, or other optical media. Hard disk drive 316, magnetic disk drive 318, and optical disk drive 322 are each connected to system bus 308 by one or more data media interfaces 325. Alternatively, hard disk drive 316, magnetic disk drive 318, and optical disk drive 322 can be connected to the system bus 308 by one or more interfaces (not shown).

The disk drives and their associated computer-readable media provide non-volatile storage of computer readable instructions, data structures, program modules, and other data for computer 302. Although the example illustrates a hard disk 316, removable magnetic disk 320, and removable optical disk 324, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 316, magnetic disk 320, optical disk 324, ROM 312, and/or RAM 310, including by way of example, operating system 326, one or more application programs 328 (which can include font smoothing as described above), other program modules 330, and program data 332. Each of such operating system 326, one or more application programs 328, other program modules 330, and program data 332 (or some combination thereof) may implement all or part of the resident components that support the distributed file system.

A user can enter commands and information into computer 302 via input devices such as keyboard 334 and a pointing device 336 (e.g., a "mouse"). Other input devices 338 (not shown specifically) may include a microphone, joystick, game pad, satellite dish, serial port, scanner, and/or the like. These and other input devices are connected to processing unit 304 via input/output interfaces 340 that are coupled to system bus 308, but may be connected by other interface and bus structures, such as a parallel port, game port, or a universal serial bus (USB).

Monitor 342 or other type of display device can also be connected to the system bus 308 via an interface, such as video adapter 344. In addition to monitor 342, other output peripheral devices can include components such as speakers (not shown) and printer 346 which can be connected to computer 302 via I/O interfaces 340.

Computer 302 can operate in a networked environment using logical connections to one or more remote computers, such as remote computing device 348. By way of example, remote computing device 348 can be a PC, portable computer, a server, a router, a network computer, a peer device or other common network node, and the like. Remote computing device 348 is illustrated as a portable computer that can include many or all of the elements and features described herein relative to computer 302. Alternatively, computer 302 can operate in a non-networked environment as well.

Logical connections between computer 302 and remote computer 348 are depicted as a local area network (LAN) 350 and a general wide area network (WAN) 352. Such networking environments are commonplace in offices, enterprise-wide computer networks, intranets, and the Internet.

When implemented in a LAN networking environment, computer 302 is connected to local network 350 via network interface or adapter 354. When implemented in a WAN networking environment, computer 302 typically includes modem 356 or other means for establishing communications over wide area network 352. Modem 356, which can be internal or external to computer 302, can be connected to system bus 308 via I/O interfaces 340 or other appropriate mechanisms. It is to be appreciated that the illustrated network connections are examples and that other means of establishing at least one communication link between computers 302 and 348 can be employed.

In a networked environment, such as that illustrated with computing environment 300, program modules depicted relative to computer 302, or portions thereof, may be stored in a remote memory storage device. By way of example, remote application programs 358 reside on a memory device of remote computer 348. For purposes of illustration, applications or programs and other executable program components such as the operating system are illustrated herein as discrete blocks, although it is recognized that such programs and components reside at various times in different storage components of computing device 302, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A computer-implemented method for font smoothing, the method comprising:
   receiving a physical description parameter that describes a physical characteristic of a rendering surface in which text is to be rendered;
   receiving a style attribute of text to be rendered including a bold text style attribute;
   receiving a first threshold for selecting between font smoothing approaches;

comparing the received physical description with the received first threshold; and choosing one of the font smoothing approaches in response to the comparing of the received physical description with the received first threshold and in response to the received bold text style attribute.

2. The method of claim 1 wherein the font smoothing approach is one of ClearType®, grayscale anti-aliasing, and substantially no font smoothing.

3. The method of claim 1 wherein an application performs the comparing of the received physical description with the received first threshold.

4. The method of claim 3 further comprising receiving a second threshold for indicating a selection of substantially no font smoothing.

5. The method of claim 1 further comprising receiving a second threshold such that a particular font smoothing approach is selected in response to the received physical description falling within a range indicated by the first and second thresholds.

6. The method of claim 5 wherein at least one of the first and second thresholds is user selectable.

7. The method of claim 1 further comprising receiving a setting for indicating whether a default system font smoothing approach should be used.

8. The method of claim 7 wherein the received setting is user selectable.

9. A computer-implemented system for font smoothing, the system comprising:

a document that is configured to receive and store text to be rendered;

a rendering surface that is configured to render text;

an application that is configured to receive a physical description of a portion of a text run that is rendered in accordance with the rendering surface and to receive a first threshold and a text style attribute of the text run including a bold text style attribute; and a font smoothing approach selection mechanism that is configured to choose a font smoothing approach in response to the received physical description with the received first threshold and in response to the received bold text style attribute.

10. The system of claim 9 wherein the font smoothing approach selection mechanism is further configured to choose a font smoothing approach that is one of ClearType® approach and grayscale anti-aliasing approach.

11. The system of claim 9 wherein the font smoothing approach selection mechanism is further configured to receive a second threshold for indicating a selection a font smoothing approach that implements substantially no font smoothing.

12. The system of claim 9 wherein the font smoothing approach selection mechanism is further configured to select a particular font smoothing approach in response to the received physical description falling within a range indicated by the first threshold and a second threshold.

13. The system of claim 9 wherein the font smoothing selection mechanism selects a font smoothing approach in response to a setting for indicating whether a default system font smoothing approach should be used.

14. The system of claim 9 wherein the font smoothing selection mechanism is comprised by the operating system.

15. A computer-implemented system for font smoothing, the system comprising:

a document means for receiving and storing text to be rendered on a rendering surface;

an application means for receiving a physical description of a portion of a text run that is rendered in accordance with the rendering surface and for receiving a first threshold and for receiving a text style attribute including a bold text style attribute for a portion of the text run;

a comparing means for comparing the received physical description with the received first threshold; and a selection means for selecting a font smoothing approach in response to the comparing of the received physical description with the received first threshold and choosing one of the font smoothing approaches in response to the received bold text style attribute.

16. The system of claim 15 wherein the selected font smoothing approach is one of ClearType® approach, grayscale anti-aliasing approach, and substantially no font smoothing approach.

17. The system of claim 15 wherein the selection means is for selecting further a particular font smoothing approach in response to the received physical description falling within a range indicated by the first threshold and a second threshold.

18. The system of claim 15 wherein the font smoothing selection mechanism means is for selecting further a font smoothing approach in response to a setting for indicating whether a default system font smoothing approach should be used.

19. The system of claim 15 wherein the received setting is user selectable.

* * * * *